United States Patent
Takemura et al.

(10) Patent No.: US 9,846,065 B2
(45) Date of Patent: Dec. 19, 2017

(54) FLOW METER DEVICE

(75) Inventors: Kouichi Takemura, Nara (JP); Fumikazu Shiba, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1394 days.

(21) Appl. No.: 13/499,258

(22) PCT Filed: Sep. 30, 2010

(86) PCT No.: PCT/JP2010/005880
§ 371 (c)(1),
(2), (4) Date: Mar. 29, 2012

(87) PCT Pub. No.: WO2011/040027
PCT Pub. Date: Apr. 7, 2011

(65) Prior Publication Data
US 2012/0185183 A1  Jul. 19, 2012

(30) Foreign Application Priority Data

Sep. 30, 2009 (JP) .................. 2009-226952

(51) Int. Cl.
*G01F 1/66* (2006.01)
(52) U.S. Cl.
CPC ............... *G01F 1/667* (2013.01); *G01F 1/66* (2013.01); *G01F 1/668* (2013.01)
(58) Field of Classification Search
CPC ............. G01F 1/667; G01F 1/66; G01F 1/668
(Continued)

(56) References Cited

U.S. PATENT DOCUMENTS 3,575,050 A * 4/1971 Lynnworth ................. 73/861.27
6,065,351 A * 5/2000 Nagaoka et al. ........... 73/861.28
(Continued)

FOREIGN PATENT DOCUMENTS

JP 08-122117 A 5/1996
JP 09-021667 A 1/1997
(Continued)

OTHER PUBLICATIONS

International Search Report for International Application No. PCT/JP2010/005880, dated Dec. 21, 2010, 2 pages.

*Primary Examiner* — Alexander Satanovsky
(74) *Attorney, Agent, or Firm* — Brinks Gilson & Lione

(57) ABSTRACT

In a flow meter device of the present invention, a unit measuring step is defined as a procedure for measuring ultrasonic sound wave propagation times by changing the direction in which an ultrasonic sound wave is transmitted and received between a first transducer and a second transducer, and a time measuring means measures a propagation time in a forward direction and a propagation time in a reverse direction in a unit measuring step. A time difference detecting means detects a difference between the propagation time in the forward direction and the propagation time in the reverse direction which are measured by the time measuring means. A determiner means determines whether or not there is a fluid flow based on the time difference. According to presence/absence of a fluid flow, the number of times the unit measuring step is performed is determined. Therefore, it can be determined whether or not there is a fluid flow quickly in real time. A responsiveness can be improved such that a measuring method can be switched to correspond to presence/absence of a fluid flow.

8 Claims, 10 Drawing Sheets

(58) Field of Classification Search
USPC .............. 702/39, 48, 50; 73/861.27, 861.28
See application file for complete search history.

(56) References Cited

U.S. PATENT DOCUMENTS

| | | |
|---|---|---|
| 2004/0267464 A1* | 12/2004 | Umekage et al. .............. 702/48 |
| 2007/0039399 A1* | 2/2007 | Groeschel ................. 73/861.27 |
| 2008/0289434 A1 | 11/2008 | Takemura et al. |
| 2013/0167656 A1* | 7/2013 | Takemura et al. ......... 73/861.28 |

FOREIGN PATENT DOCUMENTS

| | | |
|---|---|---|
| JP | 2002-350202 A | 12/2002 |
| JP | 2003-222548 A | 8/2003 |
| JP | 2004-144744 A | 5/2004 |
| JP | 2007-051890 A | 3/2007 |

* cited by examiner

FLOW METER DEVICE

This application is a 371 application of PCT/JP2010/005880 having an international filing date of Sep. 30, 2010, which claims priority to JP2009-26952 filed Sep. 30, 2009, the entire contents of which are incorporated herein by reference.

TECHNICAL FIELD

The present invention relates to a flow meter device which measures a fluid flow based on a propagation time of an ultrasonic signal.

BACKGROUND ART

Conventionally, in this type of flow meter device, a sing-around method is known, in which signal transmission and reception between two transducers is repeated plural times to enhance a measurement resolution.

An example in which this type of flow meter device is applied to a home gas meter will be described with reference to FIG. 11.

To be specific, in a fluid pipe (conduit) 101, a first transducer 102 which transmits an ultrasonic sound wave and a second transducer 103 which receives the ultrasonic sound wave are provided at an upstream side and a downstream side in a flow direction, respectively, and the ultrasonic sound wave travels across in an oblique direction a fluid flowing through the fluid pipe 101.

In addition, there are provided a measuring unit 104 for measuring a propagation time of the ultrasonic sound wave using the first and second transducers 102 and 103, a control unit 105 for controlling the measuring unit 104, and a calculating unit 106 for calculating a fluid flow based on a result of measurement of the measuring unit 104.

In FIG. 11, when a sound velocity is C, a flow velocity is v, a distance between the first and second transducers 102 and 103 is L, and an angle made between a propagation direction of the ultrasonic sound wave and a flow direction of the fluid is θ, a propagation time in a case where the first transducer 102 positioned at the upstream side on the fluid pipe 101 transmits the ultrasonic sound wave, and the second transducer 103 positioned at the downstream side on the fluid pipe 101 receives the ultrasonic sound wave is t1, and a propagation time of the ultrasonic sound wave in a reverse (opposite) direction is $t_2$, $t_1$ and $t_2$ are calculated according to the following formulas:

$$t_1 = L/(C+v \cos \theta) \quad \text{(formula 1)}$$

$$t_2 = L/(C-v \cos \theta) \quad \text{(formula 2)}$$

(formula 1) and (formula 2) are changed into (formula 3) according to which the flow velocity v is derived.

$$v = L \cdot (1/t_1 - 1/t_2)/2 \cos \theta \quad \text{(formula 3)}$$

By multiplying a value derived from the (formula 3) by a value of a cross-sectional area of the fluid pipe, the fluid flow can be derived. In (formula 3), terms in parentheses can be changed as expressed as (formula 4):

$$(t_2-t_1)/t_1 \cdot t_2 \quad \text{(formula 4)}$$

A value of a denominator in (formula 4) is substantially constant irrespective of a change in the flow velocity, whereas a value of a numerator in (formula 4) is approximately proportional to the flow velocity.

Therefore, it is necessary to measure a difference between the two propagation times with accuracy. To this end, as the flow velocity is lower, it is necessary to derive a minute time difference. To perform measurement as a single-moment phenomenon, the measuring unit 104 is required to have a time resolution which is as small as ns (nano second) order.

It is difficult to implement the above time resolution. Even if the time resolution is implemented, electric power consumption increases due to the enhanced time resolution. Because of this, transmission of the ultrasonic sound wave is repeated in succession, and the measuring unit 104 measures a time required for the series of the repeated measurement.

By calculating an average value of the required value, a required time resolution is implemented. When the time resolution of the measuring unit 104 is $T_A$, and the number of times of repeating is M, the measuring unit 104 operates continuously during the repeated measurement, and thus the measuring resolution of the propagation time is $T_A/M$.

This type of flow meter device is capable of highly accurate measurement when a pressure in the fluid passage is stable. However, when this type of meter flow device is applied to a gas meter which measures a fluid flow of gas supplied to home as an energy resource, a unique problem called a pulsation arises.

The pulsation is a phenomenon which changes a pressure in a gas supply pipe in the vicinity of a gas engine in synchronization with rotation of the gas engine, like air-conditioning equipment using, for example, the gas engine called GHP. In the event of this pulsation, gas migrates within the pipe synchronously with a change in the pressure, even in a case where a gas instrument is not activated. Because of this migration, a measurement value of the fluid flow of the gas is detected, even though the gas is not flowing actually.

As a method of suppressing an influence due to the above phenomenon, for example, the number of times M of repeated measurement is lessened to a minimum number of times with which measuring accuracy can be ensured, measurement is conducted for a relatively long time N times in succession at short measurement intervals, and the fluid flow is calculated using results of measurement performed N times in succession.

Since the measurement intervals are set much shorter than a pressure change cycle, phases of a flow velocity change waveform can be captured evenly, and are averaged to effectively detect a genuine flow velocity (fluid flow) derived by excluding a change component (see e.g., Patent Literature 1).

Continuing the above measurement method all the time is not a good approach to electric power saving. To reduce unnecessary electric power consumption, the number of times N of measurement is controlled according to a change amount of the detected flow velocity. To be specific, under the situation in which a fluid flow change is small and it is determined that there is no pulsation, the number of times N of measurement is set smaller, while under the situation in which the fluid flow change is great and it is determined that there is a pulsation, the number of times N of measurement is set greater, (see e.g., Patent Literature 2).

Patent Literature 1 Japanese Laid-Open Patent Application Publication No. 2002-350202

Patent Literature 2 Japanese Laid-Open Patent Application Publication No. 2003-222548

SUMMARY OF THE INVENTION

Technical Problem

However, in the conventional configuration, in a case where there is no pulsation, the electric power consumption can be reduced. However, a measuring method according to a magnitude of the fluid flow is not disclosed.

In particular, to efficiently use a limited electric power resource, there is a need for a method to reduce electric power consumption in the overall device by lessening a frequency of measurement in a case where a summed-up (integrated) flow value is not affected, i.e., there is no fluid flow, as well as suppressing electric power consumption in a case where there is no pulsation. In addition, there is a need for a measurement method to determine whether or not there is a fluid flow quickly and respond with a minimum delay.

The present invention is directed to solving the above problems associated with the prior art, and an object of the present invention is to provide a highly responsive flow meter device which is capable of determining whether or not there is a fluid flow quickly and of switching to a measuring method which allows efficient use of an electric power resource.

Solution to Problem

To solve the above problem associated with the prior art, a flow meter device of the present invention comprises a first transducer provided on a fluid passage to transmit/receive an ultrasonic signal, and a second transducer provided on the fluid passage to transmit/receive the ultrasonic signal; a time measuring means for measuring a propagation time of the ultrasonic signal propagating between the first and second transducers; a unit measuring step which measures the propagation time of the ultrasonic signal in a forward direction and the propagation time of the ultrasonic signal in a reverse direction by the time measuring means such that a direction in which the ultrasonic signal is transmitted and received between the transducers is changed between the forward direction and the reverse direction; a fluid flow calculating means which performs in succession the unit measuring step, and calculates a fluid flow based on propagation times corresponding to the number of times the unit measuring step is performed; a time difference detecting means which detects a difference between the propagation time in the forward direction and the propagation time in the reverse direction in the unit measuring step; and a measurement control means which selects an arbitrary unit measuring step among a series of unit measuring steps performed in succession, and controls the number of times a unit measuring step following the arbitrary unit measuring step is performed, based on the time difference detected by the time difference detecting means.

In accordance with this configuration, it is possible to provide a highly responsive flow meter device which is capable of determining whether or not there is a fluid flow quickly and of switching to a measurement method corresponding to presence/absence of a fluid flow.

The above and further objects, features and advantages of the present invention will more fully be apparent from the following detailed description of preferred embodiments with accompanying drawings.

ADVANTAGEOUS EFFECTS OF THE INVENTION

A flow meter device of the present invention is able to determine whether or not there is a fluid flow, and to perform highly responsive measurement such that a measurement method is switched to correspond to presence/absence of a fluid flow.

DETAILED DESCRIPTION OF THE PREFERRED EMBODIMENTS

Figure 1:
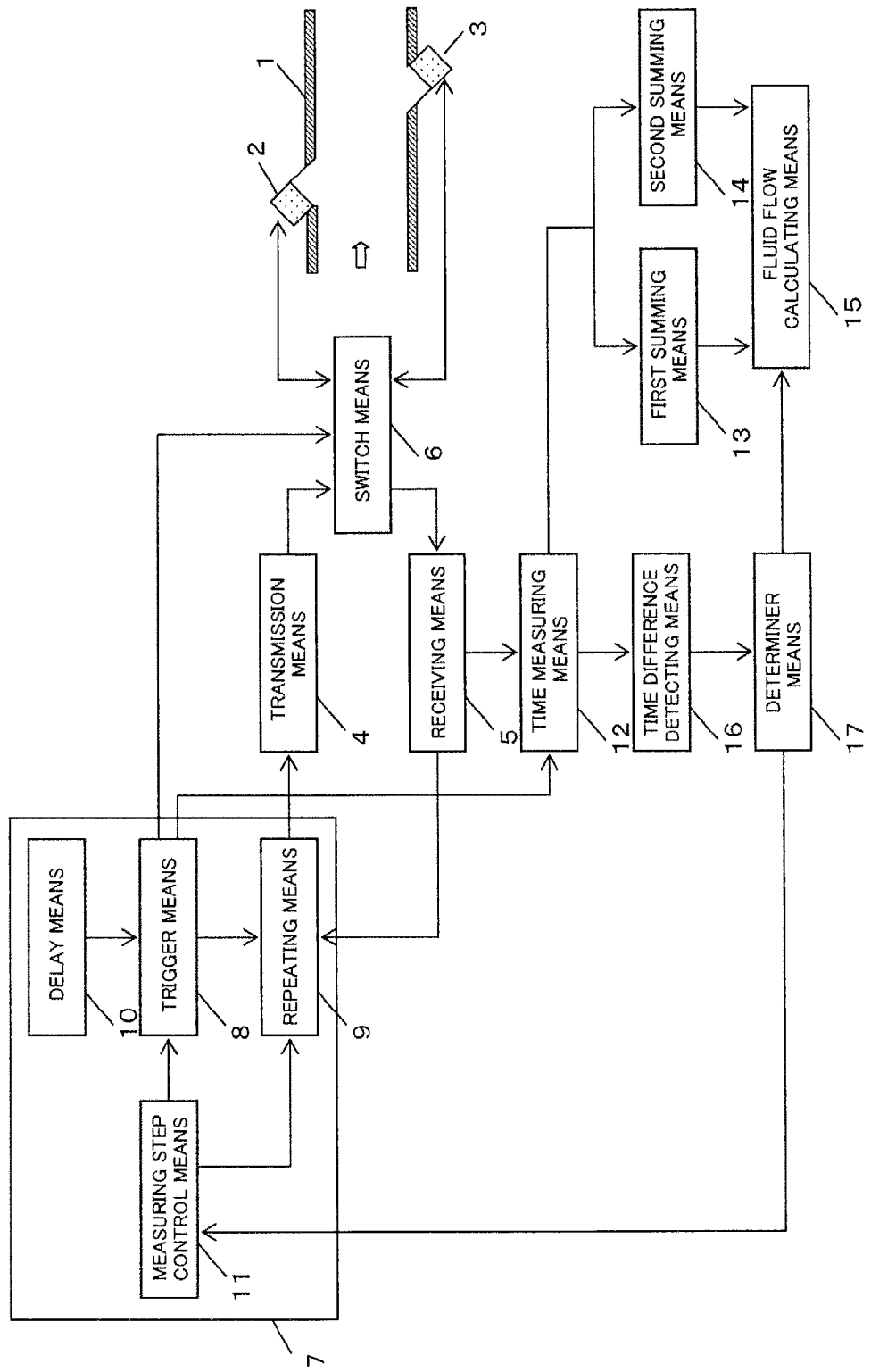
FIG. 1 is a block diagram showing an exemplary configuration of a flow meter device according to Embodiment 1 of the present invention.

A flow meter device of the present invention comprises a first transducer provided on a fluid passage to transmit/receive an ultrasonic signal, and a second transducer provided on the fluid passage to transmit/receive the ultrasonic signal; a time measuring means for measuring a propagation time of the ultrasonic signal propagating between the first and second transducers; a unit measuring step which measures the propagation time of the ultrasonic signal in a forward direction and the propagation time of the ultrasonic signal in a reverse direction by the time measuring means such that a direction in which the ultrasonic signal is transmitted and received between the transducers is changed between the forward direction and the reverse direction; a fluid flow calculating means which performs in succession the unit measuring step, and calculates a fluid flow based on propagation times corresponding to the number of times the unit measuring step is performed; a time difference detecting means which detects a difference between the propagation time in the forward direction and the propagation time in the reverse direction in the unit measuring step; and a measurement control means which selects an arbitrary unit measuring step among a series of unit measuring steps performed in succession, and controls the number of times the unit measuring step following the arbitrary unit measuring step is performed, based on the time difference detected by the time difference detecting means. Therefore, it can be determined whether or not there is a fluid flow without response delay, and highly responsive measurement can be performed such that a measurement method is switched to correspond to presence/absence of a fluid flow.

The arbitrary unit measuring step may be an initial unit measuring step among the series of unit measuring steps. Thus, responsiveness can be further enhanced.

When the time difference detected by the time difference detecting means in the arbitrary unit measuring step among the series of unit measuring steps performed in succession is smaller than a threshold, the measurement control means cancels a unit measuring step following the arbitrary unit measuring step. This makes it possible to reduce electric power consumption in a case where there is no fluid flow.

When the time difference detected by the time difference detecting means in the arbitrary unit measuring step among the series of unit measuring steps performed in succession is smaller than the threshold, the fluid flow calculating means calculates as zero, a fluid flow during the arbitrary unit measuring step. Since complicated calculation of the fluid flow is omitted in a case where there is no fluid flow, electric power consumption can be further reduced.

When a unit fluid flow calculating step is defined as an operation performed from start of the series of unit measuring steps until calculation of the fluid flow ends; and if it is detected continuously that the fluid flow is zero, the measurement control means varies an interval at which the unit fluid flow calculating step is performed every time the unit fluid flow calculating step is performed. This makes it possible to prevent misdetermination that the fluid flow is zero, in a case where a periodic pulsation occurs within the fluid passage. As a result, measurement accuracy can be improved.

When the time difference detected by the time difference detecting means in the arbitrary unit measuring step, among the series of unit measuring steps performed in succession, is greater than a threshold, the measurement control means performs the unit measuring step plural times in succession. Therefore, measurement can be made with higher accuracy in a case where there is a fluid flow.

The time measuring means is constituted by a reference clock and a counter circuit which performs counting based on the reference clock; and the time difference detecting means is constituted by a subtraction circuit using a counted value of the counter circuit such that multiplication and division in determination as to whether or not the fluid flow is zero is omitted. By a calculation method in which the subtractor circuit merely operates, it can be determined whether or not there is a fluid flow. As a result, quick control is achieved.

The time measuring means includes at least two reference clocks having different frequencies and at least two counter circuits which are different in frequency; the time difference detecting means calculates a time difference for each of the counter circuits; and the determiner means is configured to determine whether or not the fluid flow is zero based on a combination of all counted value differences of the counters which are detected by the time difference detecting means. Thus, it can be determined whether or not the fluid flow is zero with higher accuracy.

Hereinafter, embodiments of the present invention will be described with reference to the drawings. Throughout the drawings, the same or corresponding constituents are designated by the same reference numerals and repetitive description thereof is omitted.

The embodiments below are in no way intended to limit the present invention.

(Embodiment 1)

Figure 2:
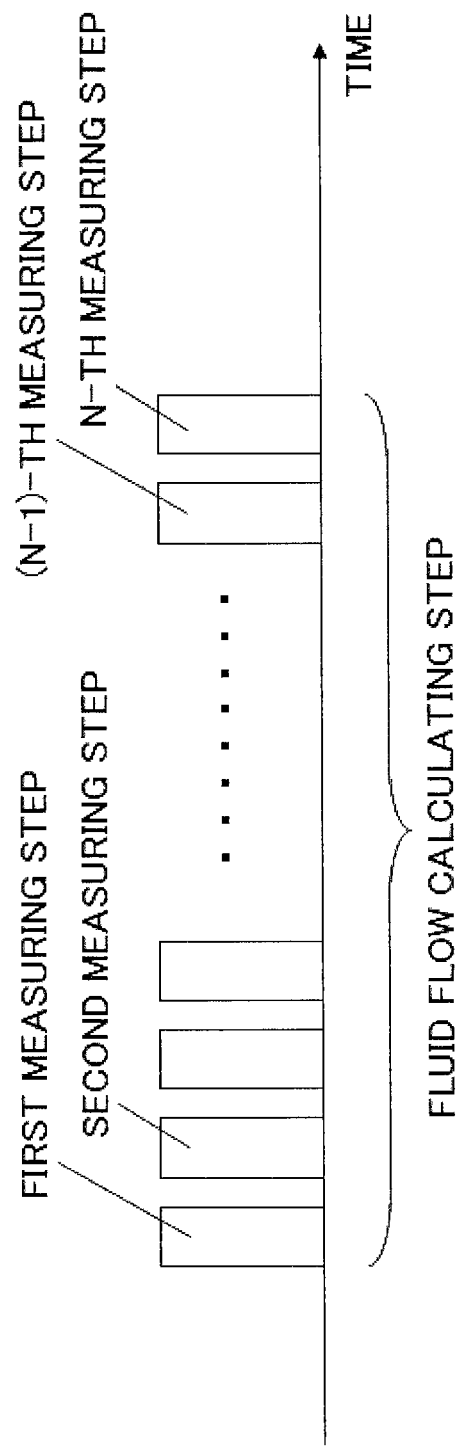
FIG. 2 is a time chart showing an exemplary procedure of a fluid flow calculating step in an operation of the flow meter device of FIG. 1.
Figure 3:
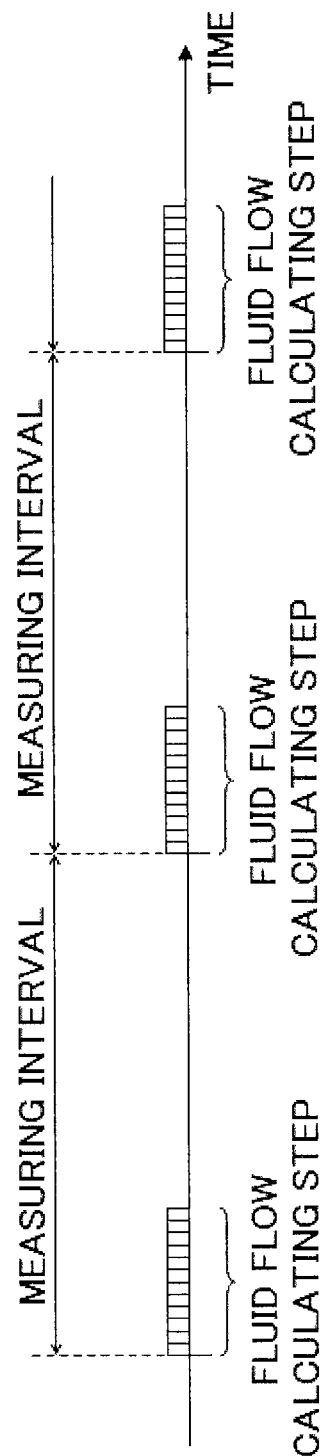
FIG. 3 is a time chart showing measurement intervals of the fluid flow calculating step of FIG. 2.

With reference to FIGS. 1, 2, and 3, a configuration of a flow meter device according to the present embodiment will be described. FIG. 1 is a block diagram showing an exemplary configuration of a flow meter device according to the present embodiment.

As shown in FIG. 1, in the flow meter device of the present embodiment, a first transducer 2 for transmitting/receiving an ultrasonic signal, and a second transducer 3 for transmitting/receiving the ultrasonic signal are placed to face each other in an oblique direction at an upstream side and a downstream side on a fluid passage (pipe or conduit) 1, respectively. An ultrasonic sound wave travels across in the oblique direction a fluid flowing through the fluid passage 1. As the first transducer 2 and the second transducer 3, known piezoelectric ceramic transducers which are able to transmit and receive the ultrasonic sound wave are suitably used. But, the present invention is not limited to this, but another known ultrasonic transmitting/receiving elements may be used.

A transmission means 4 outputs a drive signal to the first transducer 2. The first transducer 2 outputs the ultrasonic signal. The second transducer 3 receives the ultrasonic signal from the first transducer 2. The received signal is processed in a receiver means 5.

A switch means 6 is configured to switch between transmission and reception of the first transducer 2 and the second transducer 3.

A measurement control means 7 controls the overall operation of the transmission and reception performed between the first transducer 2 and the second transducer 3. The measurement control means 7 includes a trigger means 8, a repeating means 9, a delay means 10, and a measurement step control means 11.

When the trigger means 8 outputs a trigger signal for initiating measurement, the switch means 6 connects the first transducer 2 to the transmission means 4 and connects the second transducer 3 to the receiver means 5. In the state where the first transducer 2 is ready to transmit the ultrasonic signal and the second transducer 3 is ready to receive the ultrasonic signal is initiated. For easier explanation, hereinafter, this measurement is hereinafter referred to as forward flow measurement.

When the transmission means 4 outputs the drive signal, the first transducer 2 outputs the ultrasonic signal. Upon the ultrasonic signal reaching the second transducer 3, it is processed by the receiver means 5. Once this receiving processing is performed, the repeating means 9 is actuated to perform sing-around measurement in a forward flow direction which is a series of measurements repeated a predetermined number of times. Although the predetermined number of times of repeating is set to four in the present embodiment, the present invention is not limited to this. If a measurement resolution is high, measurement may be performed only once instead of the sing-around measurement.

When measurement repeated four times is completed, the delay means 10 generates a predetermined delay time, and then the trigger means 8 outputs a switch signal to the switch means 6 to switch between transmission and reception of the ultrasonic signal. In accordance with this, the switch means 6 connects the second transducer 3 to the transmission means 4 and connects the first transducer 2 to the receiver means 5. In the state where the second transducer 3 is ready to transmit the ultrasonic signal and the first transducer 2 is ready to receive the ultrasonic signal, measurement is initiated. For easier explanation, hereinafter, this measurement is referred to as reverse flow measurement.

At this time, the trigger means 8 outputs a trigger signal for initiating measurement. In accordance with this, the reverse flow measurement in which a direction of transmission and reception is reversed is repeated four times.

A series of measurement operations including the forward flow sing-around measurement (four-time repeated measurement) performed once and the reverse flow sing-around measurement (four-time repeated measurement) performed once in an alternate manner as described above is referred to as a unit measuring step. The unit measuring step and a fluid flow calculating step will be described with reference to the flowcharts shown in FIGS. 2 and 3.

As shown in FIG. 2, when the unit measuring step performed initially is referred to as a first measuring step, the delay means 10 outputs a delay signal, upon the first measuring step being completed, and the operation similar to that of the first measuring step is repeated. This is a second measuring step. Hereinafter, the unit measuring step is repeated in the same manner a predetermined number of times. A n-th unit measuring step is referred to as a n-th measuring step.

After the measurement step control means 11 performs the unit measuring step a predetermined number of times (n=N times), a fluid flow is calculated. The unit measuring steps of the predetermined number of times are collectively referred to as a fluid flow calculating step. As shown in FIG. 3, the flow meter device of the present invention performs the fluid flow calculating step at specified measuring intervals to measure the fluid flow. Note that the length of the specified measuring intervals and the predetermined number of times of the unit measuring step are not particularly limited, but may be set appropriately according to various conditions.

The time measuring means 12 measures a time which passes from a timing when the trigger means 8 outputs a trigger signal until the sing-around ends. A first summing (addition) means 13 integrates (sums up) the measured values of the time measuring means 12 in the forward flow measurements in respective unit measuring steps, while a second summing means 14 integrates measured values of the time measuring means 12 in the reverse flow measurements in respective unit measuring steps.

Upon the operation of the unit measuring steps of the predetermined N times being completed, the fluid flow calculating means 15 calculates a fluid flow value using an output value of the first summing means 13 and an output value of the second summing means 14.

The time difference detecting means 16 calculates a difference between the measured value of the time measuring means 12 in the forward flow measurement and the measured value of the time measuring means 12 in the reverse flow measurement, after the first measuring step is completed.

A determiner means 17 compares an output value of the time difference detecting means 16 to a determination threshold. If the output value is greater than the threshold, the determiner means 17 determines that there is a fluid flow. If the output value is smaller than the threshold, the determiner means 17 determines that there is no fluid flow (fluid flow is zero). The determiner means 17 outputs a determination result to the measuring step control means 11.

According to the result of determination made by the determiner means 17, the measuring step control means 11 sets the number of times the unit measuring step is performed, to derive the fluid flow.

As the transmission means 4, the receiver means 5, the switch means 6, and the measurement control means 7, specifically, a transmission circuit having a known configuration, a receiver circuit having a known configuration, a switch circuit having a known configuration, and a controller having a known configuration are used, respectively, but the present invention is not limited to this.

The specific configuration of the trigger means 8, the repeating means 9, the delay means 10, and the measurement step control means 11, which constitute the measurement control means 7, are not particularly limited. A known trigger output circuit, a known repeating control circuit, a known delay circuit, and a known circuit for setting the number of times of the unit measuring steps are used. These circuits may constitute a measurement control circuit. In a case where the measurement control means 7 is constituted by a single controller, the trigger means 8, the repeating means 9, the delay means 10, and the measurement step control means 11 may be functional blocks of a controller. In other words, the trigger means 8, the repeating means 9, the delay means 10, and the measuring step control means 11 may be implemented in such a manner that, for example, a CPU as the controller operates according to programs stored in a memory unit of a memory or the like (not shown).

As the first summing means 13, the second summing means 14, the fluid flow calculating means 15, the time difference detecting means 16, and the determiner means 17, specifically, a known summing circuit, a known processor, a known time difference detecting circuit, and a known determiner circuit are used. The present invention is not limited to these. For example, the first summing means 13, the second summing means 14, the fluid flow calculating means 15, the time difference detecting means 16, and the determiner means 17 may be functional blocks implemented as a single controller, like the above measurement control means 7. The specific configuration of the time measuring means 12 will be described later. The present invention is not limited to this, but other known configuration may be used.

The transmission means 4, the receiver means 5, the switch means 6, and the measurement control means 7 (and the trigger means 8, the repeating means 9, the delay means 10, and the measurement step control means 11 constituting the measurement control means 7), the time measuring means 12, the first summing means 13, the second summing means 14, the fluid flow calculating means 15, the time difference detecting means 16, and the determiner means 17 are constituents in the flow meter device of the present embodiment. Of course, other constituents may be included in the flow meter device of the present invention. These constituents constitute circuit units or functional units in the flow meter device as described above. Therefore, in the present embodiment, these constituents may be read as a transmission section or a transmitter, a receiver unit or a receiver, a switch unit or a switch, a measurement control unit or a measurement controller (trigger unit, repeating unit, delay unit, and measuring step control unit), a time measuring unit or a timer, a first or second summing unit or a first or second summer (adder), a fluid flow calculating unit or a fluid flow calculator, a time difference detecting unit or a time difference detector, and a determiner unit or a determiner.

Figure 4:
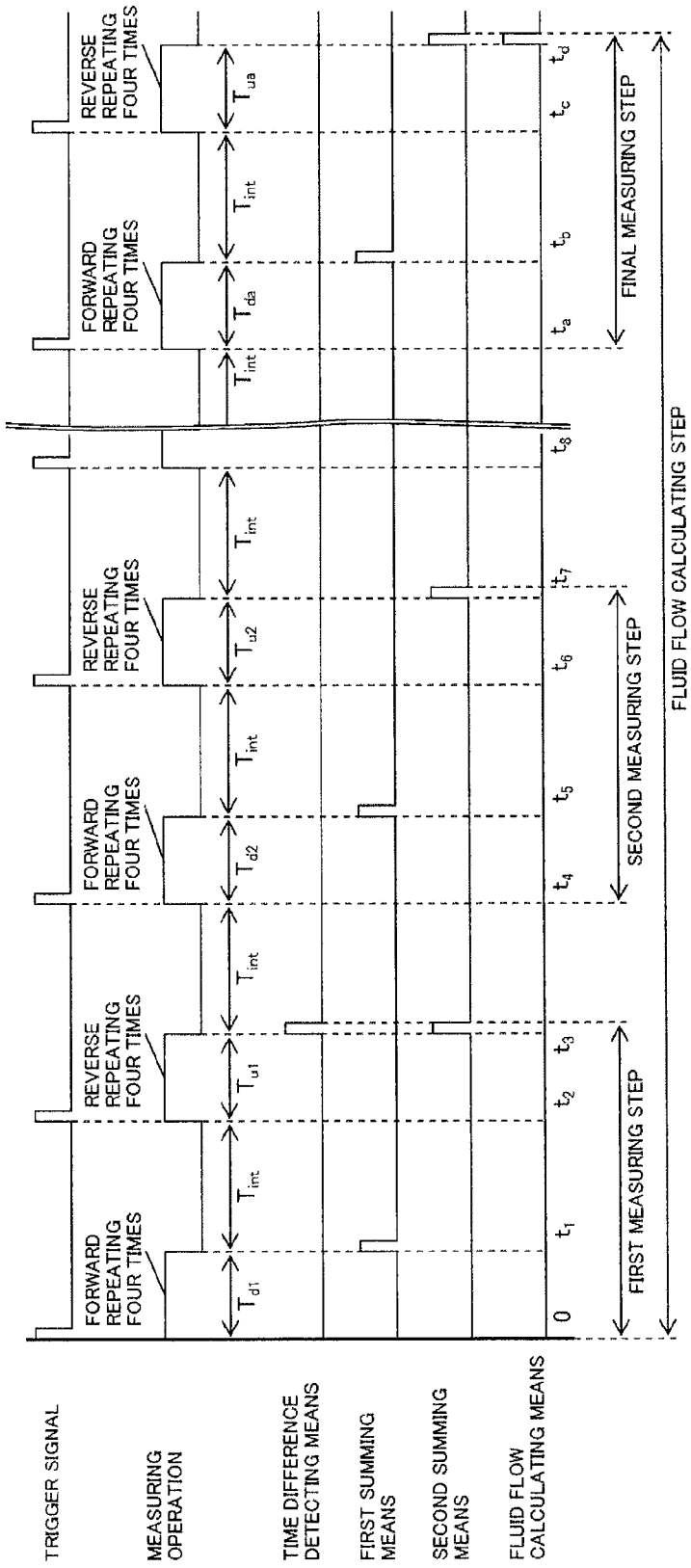
FIG. 4 is a time chart showing the operation of the flow meter device of FIG. 1.

Next, a flow of the operation of the above described constituents will be described with reference to FIG. 4. FIG. 4 is a time chart in which a horizontal axis indicates a time which passes from an origin which is an output timing of the trigger means 8 showing the initiation of the forward flow measurement in the first measuring step, and a vertical axis indicates the operation of the respective constituents.

Firstly, at time $t_1$, a value $T_{d1}$ of forward flow measurement in the first measuring step measured by the time measuring means 12 is output to the time difference detecting means 16 and is summed up (integrated) by the first summing means 13. Thereafter, at time $t_2$, after a passage of a predetermined delay time $T_{int}$, the reverse flow measurement is initiated. At time $t_3$, a value $T_{u1}$ of the reverse flow measurement in the first measuring step measured by the time measuring means 12 is output to the time difference detecting means 16.

The time difference detecting means 16 calculates a difference between the two measurement values $T_{d1}$ and $T_{ub}$ i.e., $T_{dif1}$, according to (formula 5).

$$T_{dif1} = T_{u1} - T_{d1} \quad \text{(formula 5)}$$

Concurrently, $T_{u1}$ is summed up (integrated) by the second summing means 14. Switch of the control based on the time difference derived using the (formula 5) will be described later.

In the second measuring step and the following measuring steps, in the same manner, the first summing means 13 performs summation (addition) every time the forward flow measurement ends and the second summing means 14 performs summation every time the forward flow measurement ends, which occurs alternately.

At time $t_d$ when all of the unit measuring steps of a predetermined number of times end, the fluid flow calculating means 15 calculates the fluid flow using a total value of forward propagation times summed up by the first summing means 13 and a total value of reverse propagation times summed up by the second summing means 14.

In the fluid flow calculating means 15, an average value $t_1$ per propagation time is derived from the value held in the first summing means 13 and an average value $t_2$ per propagation time is derived from the value held in the second summing means 14. Then, the flow velocity is derived using the (formula 3). Further, by multiplying the flow velocity by required coefficients, a fluid flow value is derived. An operation performed from time t=0 before time $t_d$ when the fluid flow is calculated is referred to as a unit fluid flow calculating step.

The fluid flow calculation is not carried out every unit measuring step, to save electric power. In a case where there is a fluid flow, it is necessary to sample a fluid flow state (physical amount associated with the fluid flow) at intervals of $T_{int}$ in FIG. 4 set to a relatively short value (e.g., several ms) to capture the fluid flow state for higher accuracy. A calculation amount becomes enormous if the fluid flow is calculated in every unit measuring step, which inevitably leads to increased electric power consumption.

In view of the above, only the propagation times are sampled at short intervals, and the unit measuring step is repeated a specified number of times (e.g., several tens of times). After that, using an average value of the sampled propagation times, the fluid flow is calculated. This makes it possible to drastically reduce the amount of calculation as compared to a case where the fluid flow is calculated in every unit measuring step.

Next, with reference to FIG. 5, the operation in a case where there is no fluid flow will be described. Like the case shown in FIG. 4, at time $t_3$ when the first measuring step ends, the time difference detecting means 16 calculates a difference between forward propagation time and reverse propagation time, i.e., $T_{dif1}$, according to (formula 5).

If there is no fluid flow, this value is equal to approximately zero. Therefore, a proper threshold with which the fluid flow is assumed to be zero is set. Depending on whether or not $T_{dif1}$ exceeds the threshold, the measurement control means 7 operates to change the operation which occurs thereafter.

Figure 5:
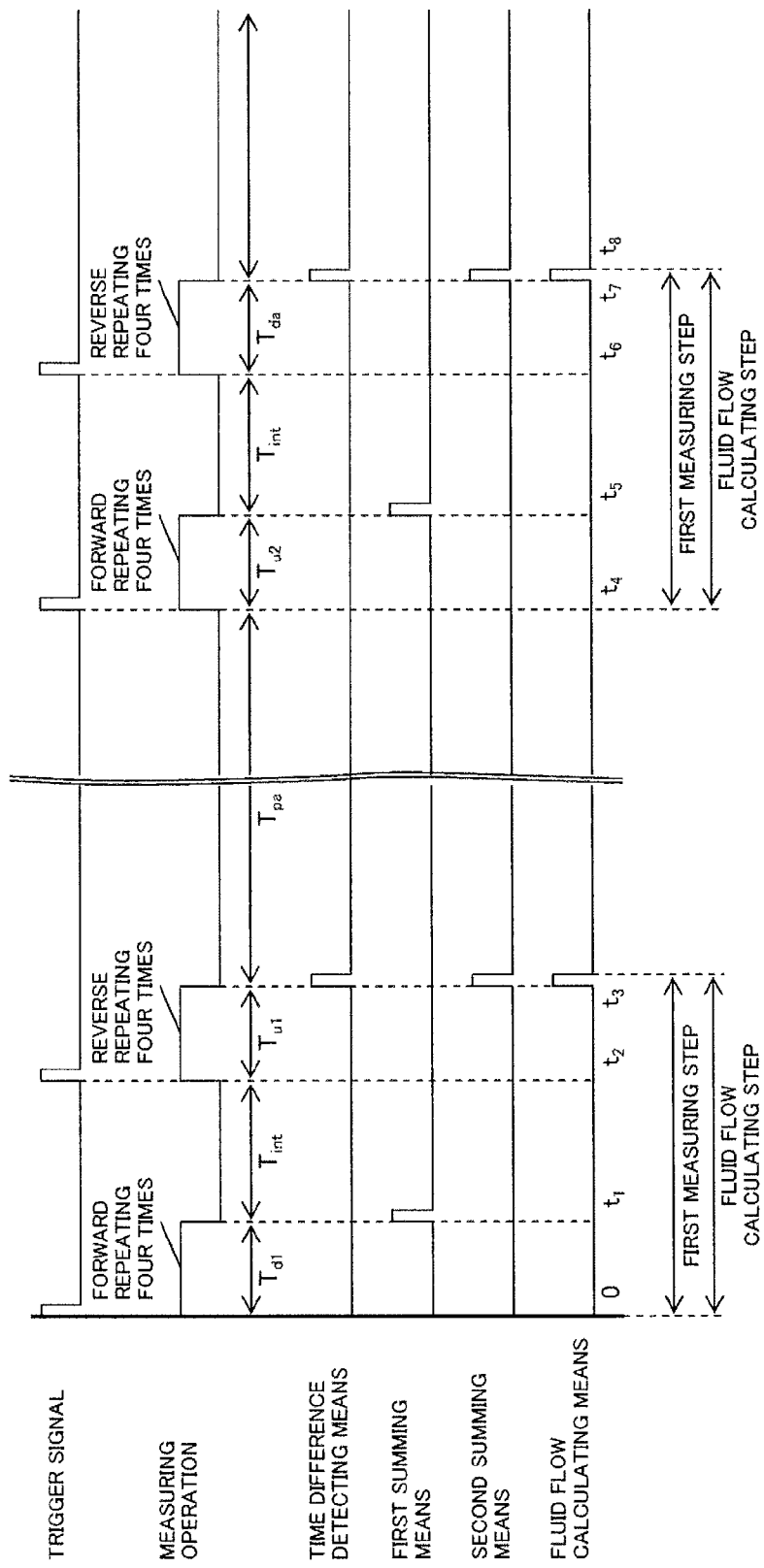
FIG. 5 is a time chart showing the operation of the flow meter device of FIG. 1, when the fluid flow is zero.

FIG. 5 is a flow chart of the operation in the case where $T_{dif1}$ is smaller than the threshold, i.e., there is no fluid flow. Firstly, at time $t_3$, the determiner means 17 compares $T_{dif1}$ to the determination threshold in magnitude. If $T_{dif1}$ is smaller than the determination threshold, the measuring step control means 11 in the measurement control means 7 stops outputting a trigger signal for triggering the second measuring step and the following measuring step. In this way, the unit measuring step after the first measuring step is cancelled. The fluid flow calculating means 15 does not perform fluid flow calculation including the (formula 3), and calculates the fluid flow as zero.

As described above with reference to FIG. 4, the time intervals at which the unit measuring step is performed in succession is set to about several ms. After it is detected that the fluid flow is zero, the measurement control means 7 performs control such that the first measuring step which corresponds to start of a fluid flow calculating step is initiated at time $t_4$ which is after a passage of a time interval (e.g., 100 ms) which is much longer than several ms.

On the other hand, if $T_{dif1}$ is greater than the threshold, the measurement control means 7 performs control such that the operation based on the time chart shown in FIG. 4, i.e., the unit measuring step is performed N times at intervals of several ms.

As described above, only in the case where there is no fluid flow, only one unit measuring step is performed at time intervals of about 100 ms. An operation time is shorter and complicated fluid flow calculation is omitted, as compared to a case where the unit measuring step is carried out at time intervals of several ms, like a case where there is a fluid flow. As a result, electric power consumption can be reduced significantly.

When this method is applied to a home gas meter, electric power saving is achieved, because in most time periods of one day, gas instruments are not activated. A battery power supply is used because the gas meter is installed outside home. Limited electric power energy is allocated to time periods for which the gas instruments are activated.

Once it is detected that the fluid flow is zero, the time interval which passes before a next fluid flow calculating step is performed is not fixed to 100 ms, but may be varied randomly. This makes it possible to prevent misdetermination that the fluid flow is zero, even though there is a fluid flow, in a case where a periodic pulsation occurs within the passage.

Although in the present embodiment, the measurement control means 7 selects the first measuring step as the arbitrary unit measuring step among the series of unit measuring steps performed in succession. The present invention is not limited to this, but any one of the second and following unit measuring steps may be selected as the arbitrary unit measuring step. If N-th measuring step is selected when the unit measuring step is repeated N times, the following unit measuring step cannot be cancelled. Therefore, the measurement control means 7 is preferably configured to select any one of steps from a first unit measuring step to (N-1)-th unit measuring step, as the arbitrary unit measuring step.

To reduce electric power consumption, the measurement control means 7 is more preferably configured to select an initial unit measuring step among the series of unit measuring steps. The initial unit measuring step may be any one of the unit measuring steps from the first unit measuring step to a unit measuring step of an ordinal number of an integer smaller than N/2 (times which is before a half of N times). When an upper limit value of the number of times which can be selected is $N_{max}$, $N_{max}$ may be at least a maximum integer which is less than N/2. Depending on the magnitude of N, $N_{max}$ may be an integer smaller than, for example, N/3, N/4 or a smaller number.

Although in the present embodiment, the measurement control means 7 is configured to cancel a unit measuring step after the arbitrary unit measuring step, it may be configured to perform other control as the control for the number of times the unit measuring steps is performed. For example, other control may be such that the unit measuring step is cancelled after it is repeated several times, the number of times of the unit measuring steps is reduced significantly, or some of the unit measuring steps is skipped under a preset condition.

In accordance with the configuration of the present embodiment, it is determined substantially instantly whether or not there is a fluid flow. According to this determination, a measuring method is switched (changed) substantially instantly to correspond to the presence/absence of a fluid flow. Instead of instantly, it may be determined substantially quickly whether or not there is a fluid flow, and the measuring method may be changed (switched) to an appropriate one quickly so long as the electric power consumption is reduced effectively.

Figure 6:
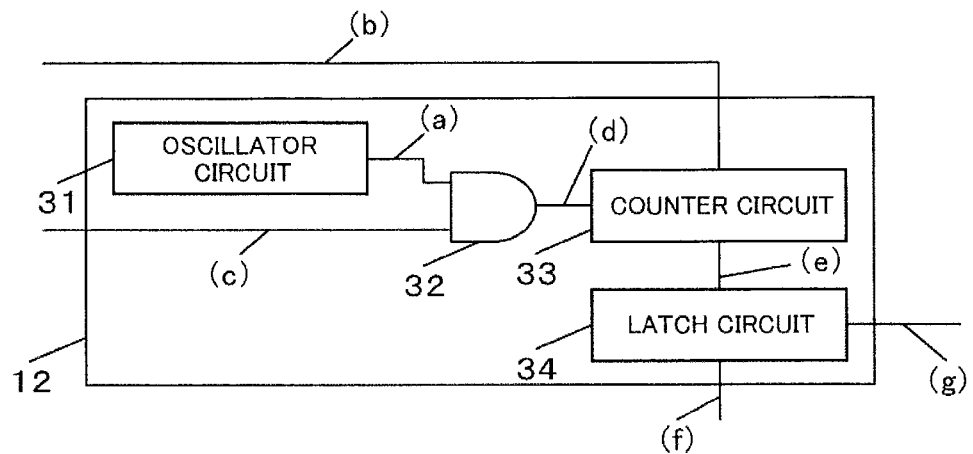
FIG. 6 is a schematic view showing an exemplary circuit configuration of a time measuring means in the flow meter device of FIG. 1.

Next, a configuration of the time measuring means 12 will be described with reference to FIGS. 6 and 7. As shown in FIG. 6, the time measuring means 12 includes an oscillator circuit 31 for generating a clock signal (a), a gate circuit 32 constituted by an AND circuit which is fed with a signal (c) which switches feeding/non-feeding of the clock signal (a) output from the oscillator circuit 31 and the clock signal (a), a counter circuit 33 for counting a reference clock (d) output via the gate circuit 32, and a latch circuit 34 which reads out a counted value of the counter circuit 33 at a proper timing. In FIG. 6, (a)~(g) indicate digital signals transmitted between the time measuring means 12 and the constituents.

Upon the trigger signal being output from the trigger means 8 to initiate the measurement, the signal (b) goes to "L", and the counter circuit 33 is cleared. Concurrently, the signal (c) goes to "H", and the gate circuit 32 becomes active. The clock (a) output from the oscillator circuit 31 is supplied to the counter circuit 33 via the gate circuit 32 as the reference clock (d).

The counter circuit 33 is an up-counter which increments a value by one every time the counter circuit 33 is fed with the reference clock. (e) indicates a counted value of the counter circuit 33.

When a predetermined number of times of repeating finishes, the repeating means 9 outputs a control signal. The signal (c) goes to "L", and the gate circuit 32 becomes inactive. Thereafter, the feeding of the reference clock (d) to the counter circuit 33 is stopped. Concurrently, the signal (f) goes to "H", and a counted value of the counter circuit 33 is output to the latch circuit 34 at this timing. A value read in the latch circuit 34 is output to the time difference detecting means 16, the first summing means 13, and the second summing means 14, as the signal (g).

Figure 7:
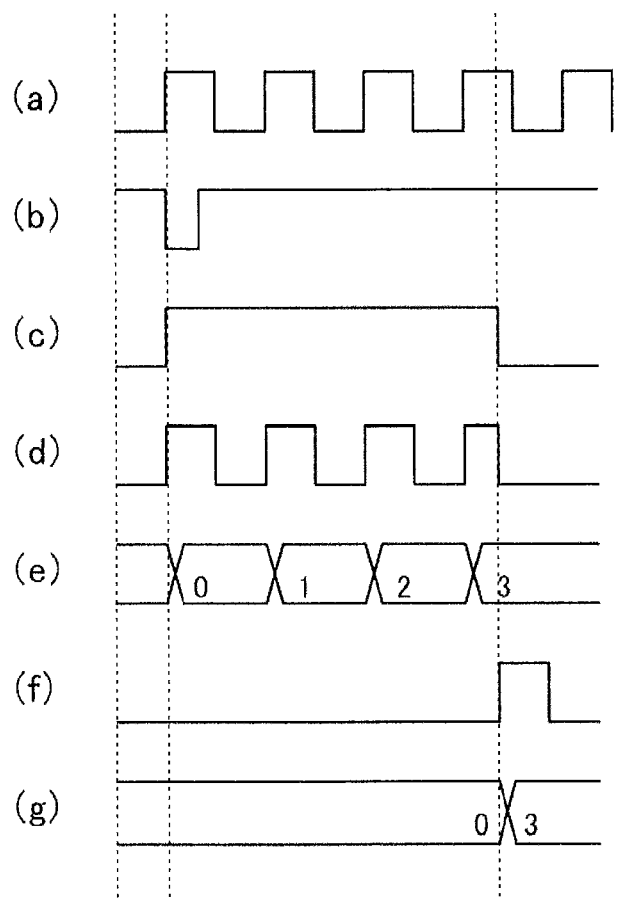
FIG. 7 is a time chart showing the operation of the time measuring means of FIG. 6.

FIG. 7 shows how the signals operate in a case where a time period for which the gate signal (c) is "H" is set to a short time period which is 3 cycles of the clock plus α. In the case shown in FIG. 7, a measured value of the time measuring means 12 is 3.

Figure 8:
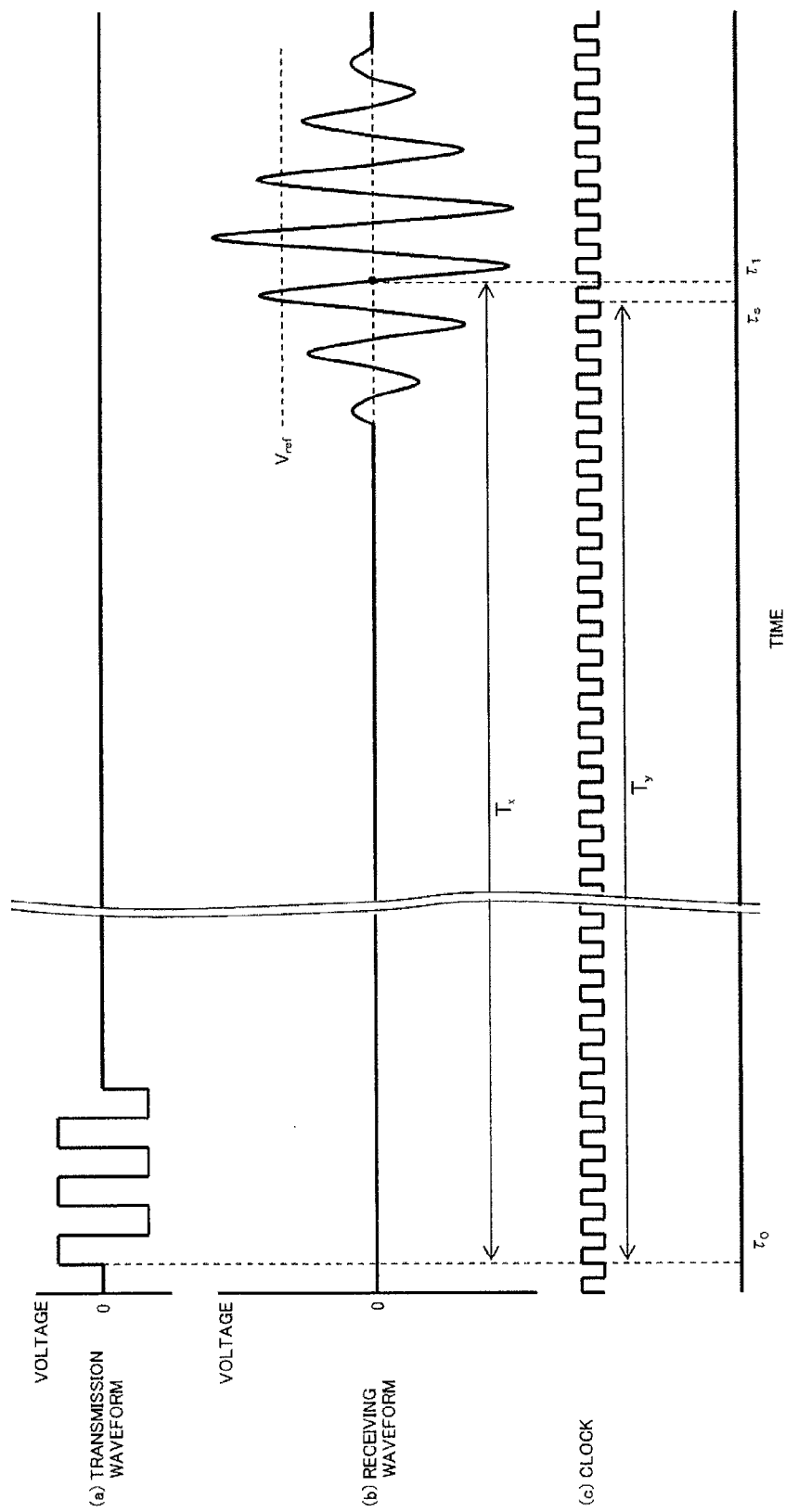
FIG. 8 is a time chart showing the time chart of FIG. 7 in greater detail in the time measuring means of FIG. 6.

FIG. 8 is a time chart showing the operation of the time measuring means 12 in greater detail. In FIG. 8, a horizontal axis indicates a time, and a vertical axis indicates voltage levels of the signals of (a)~(c).

The signal (a) is an ultrasonic drive signal output from the transmission means 4, and a square AC signal having a frequency of about 500 kHz. The signal (b) is a received ultrasonic waveform processed by the receiver means 5.

The reception means 5 constitutes a waveform shaping circuit (not shown) which assumes that reception is completed at a point (zero cross point) when 0V is reached first after a threshold voltage $V_{ref}$ is exceeded. Upon detecting completion of the reception, the transmission means 4 outputs the ultrasonic drive signal again.

In the example shown in FIG. 8, a repeated part in the middle is omitted, and a point at which last sing-around reception is completed is depicted. When a start time of the sing around is $\tau_0$ and a finish time of the sing-around is $\tau_1$ in the example of FIG. 8, a correct value of required time is represented by:

$$T_x = \tau_1 - \tau_0 \qquad \text{(formula 6)}$$

As shown in FIG. 8, the time measuring means 12 counts time which passes until it reaches a rising time $\tau_s$ of a clock which is immediately before $\tau_1$. In this case, the measured value is represented by:

$$T_y = \tau_s - \tau_0 \qquad \text{(formula 7)}$$

Since a difference between $\tau_1$ and $\tau_s$ is within one cycle of the reference clock, a measurement error is within one clock, of course.

For the sake of brevity of explanation, a cycle of the received ultrasonic waveform is substantially equal to a cycle of the reference clock. However, in actual measurement, an error of one clock can be set to fall within a range which is not problematic, by setting the cycle of the reference clock much smaller than the cycle of the received ultrasonic waveform.

When the cycle of the reference clock is $T_{sc}$, $T_y$ is represented by:

$$T_y = N \times T_{sc} \qquad \text{(formula 8)}$$

N is a counted value of the counter circuit 33. Therefore, calculation in the time difference detecting means 16 is implemented only by a subtraction circuit for calculating a difference in the counted value of the counter circuit 33 between the forward flow measurement and the reverse flow measurement. In addition, the operation of determination performed by the determiner means 17 using the threshold can be implemented only by a simple subtraction circuit.

If the configuration of the time measuring means 12 is a simple configuration consisting of a reference clock generating means (oscillator circuit 31 and gate circuit 32) and the counter means (counter circuit 33) which performs counting in synchronization with the operation of the reference clock generating means, in the above described manner, calculation of the time difference in the time difference detecting means 16, and the determination performed by the determiner means 17 using the threshold can be implemented only by a simple subtraction circuit.

Therefore, it can be determined whether or not there is a fluid flow without a need for multiplication and division, a result can be derived in a short time just after the unit measuring step ends, and it can be determined whether or not the fluid flow is zero without a response delay and great electric power consumption.

(Embodiment 2)

In Embodiment 1, a counter means constituting the time measuring means 12 is a single counter circuit 33. The present invention is not limited to this, but the counter means may be constituted by two or more counter circuits. An example of this configuration will be described specifically. A specific configuration of a flow meter device of the present embodiment is identical to that of Embodiment 1 except for the counter means of the time measuring means 12, and description thereof is omitted.

In the flow meter device having the configuration described in Embodiment 1, a reference clock frequency in the time measuring means 12 is increased to reduce a measurement error. However, increasing the frequency to excess is not a good approach to electric power saving. To solve this, in a conventional method, the time measuring means 12 is constituted by two counters which are different in frequency. Even in this case, in the present invention, it can be determined whether or not the fluid flow is zero, by a simple configuration consisting of only a subtraction circuit.

This will be described with reference to FIG. 9. In the example shown in FIG. 9, the counter means of the time measuring means 12 includes two counter circuits which are a low-speed counter circuit and a high-speed counter circuit (these are not shown). "(c) low-speed clock" in FIG. 9 corresponds to the "(c) clock" in FIG. 8, and the low-speed counter circuit uses this low-speed clock as a reference clock. The high-speed counter circuit uses a high-speed clock having a frequency which is much higher (e.g., several hundreds times higher) than that of the low-speed clock, as a reference clock.

The operation at the low-speed clock side is identical to that of FIG. 8, and description thereof is omitted. The operation at the high-speed clock side will be described with reference to FIG. 10 in addition to FIG. 9. FIG. 9 shows a time chart to make clear the frequency of the low-speed clock. FIG. 10 is a time chart showing a part extracted from the time chart of FIG. 9 to make clear the relationship between the low-speed clock and the high-speed clock.

The high-speed clock starts to operate from a reception point $\tau_1$ until a timing $\tau_2$ at which a next low-speed clock rises. The high-speed counter circuit counts a time from $\tau_1$ until $\tau_2$. In this case, when the operation time of the high-speed counter circuit is $T_Z$, a required time $T_{y2}$ of the sing-around can be derived according to the following formula:

$$T_x \approx T_{y2} = (\tau_2 - \tau_0) - T_z = (\tau_S + T_{SC} - \tau_0) - T_z \quad \text{(formula 9)}$$

TSC is a cycle of the low-speed clock. According to the (formula 7), $$T_{y2} = T_y + T_{SC} - T_Z \quad \text{(formula 10)}$$

When the counted value of the low-speed counter circuit is N, the counted value of the high-speed counter circuit is M, and the cycle of the high-speed clock is $T_{fc}$, the (formula 10) can be changed into the following formula:

$$T_{y2} = (N+1) \times T_{SC} - M \times T_{fc} \quad \text{(formula 11)}$$

Figure 9:
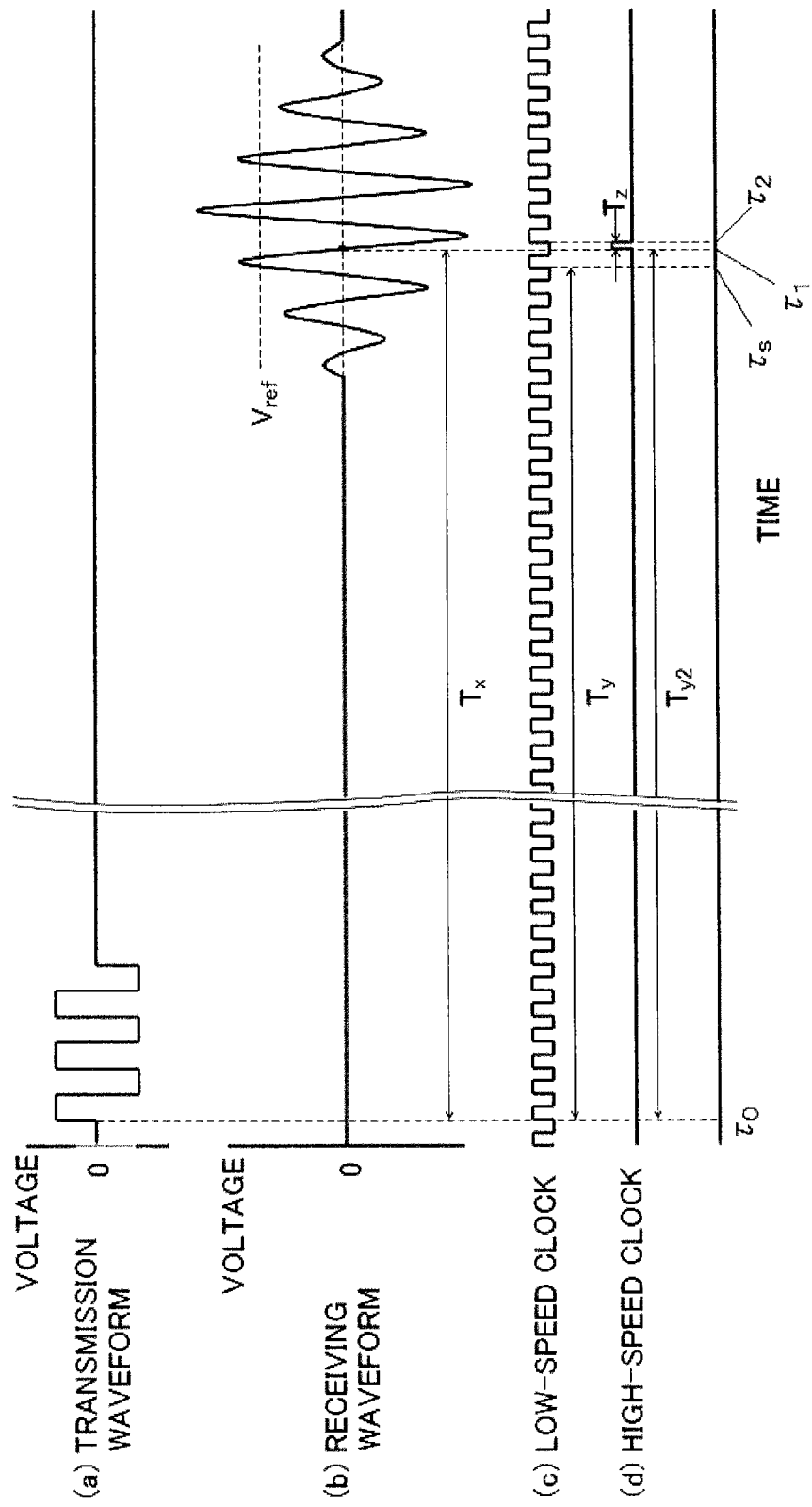
FIG. 9 is a time chart showing the operation of the time measuring means in a flow meter device according to Embodiment 2 of the present invention.
Figure 10:
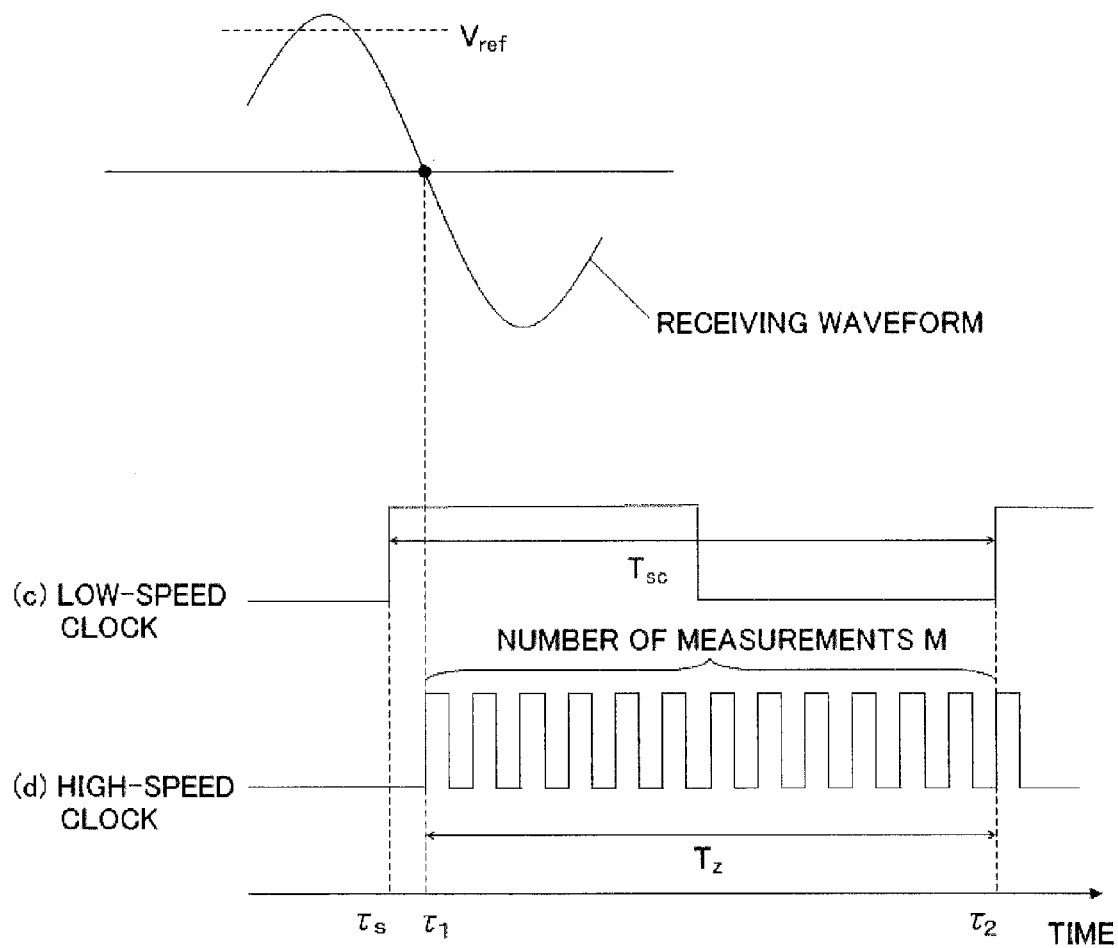
FIG. 10 is a time chart showing a major part of the time chart of FIG. 9.
Figure 11:
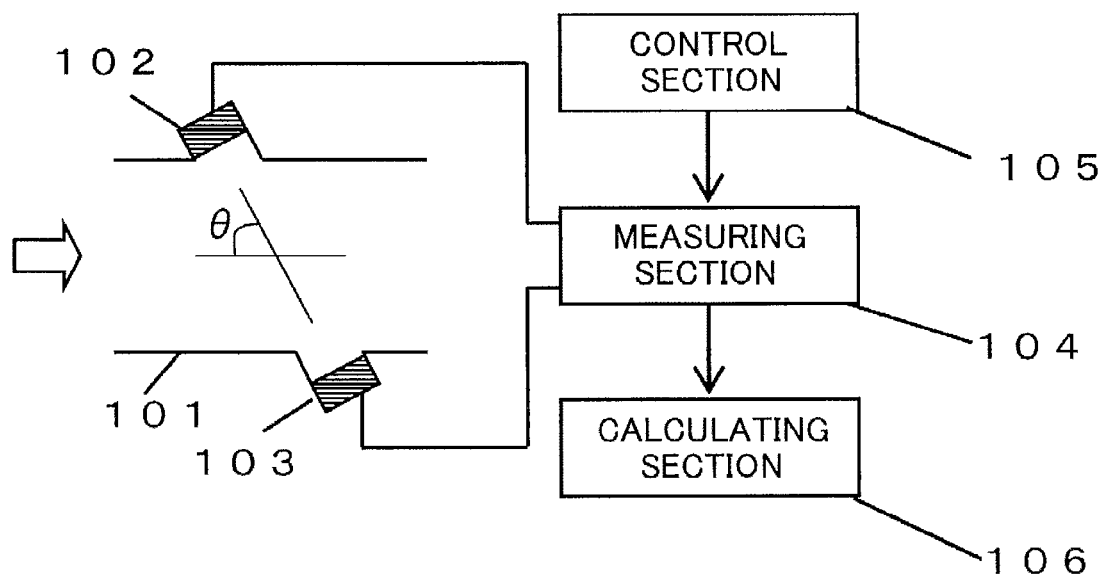
FIG. 11 is a block diagram showing an exemplary configuration of a conventional flow meter device.

In the example shown in FIG. 9 and the example shown in FIG. 10, the measurement error is one clock of the cycle $T_{fc}$ of the high-speed counter circuit, which significantly improves time accuracy as compared to that shown in FIG. 8. In addition, the operation time of the high-speed clock which consumes electric current with a great quantity is very short, which will not consume electric power wastefully.

When the time difference detecting means 16 derives a time difference between the value of forward flow measurement and the value of reverse flow measurement, for the values counted by the two counter circuits, it can be determined whether or not the fluid flow is zero by the following determination, for example:

When $\Delta_{sn} = 0$ and $|\Delta_{fn}| \leq 2$, the fluid flow is zero.
When $|\Delta_{sn}| \geq 1$, there is a fluid flow.

$\Delta_{sn}$ indicates a difference value corresponding to the low-speed counter circuit which is calculated by the time difference detecting means 16, while $\Delta_{fn}$ indicates a difference value corresponding to the high-speed counter circuit which is calculated by the time difference detecting means 16. This is based on a concept that if the fluid flow is zero, the difference corresponding to the low-speed counter circuit is zero, and only the value corresponding to the high-speed counter circuit is a little different.

Therefore, even when the time measuring means 12 is constituted by the two counter circuits which are different in frequency, it can be determined whether or not there is a fluid flow merely by using a subtraction circuit.

Although an example in which the time measuring means 12 is constituted by the two counter circuits which are different in frequency has been described, similar advantages can be achieved even when the time measuring means 12 is constituted by a combination of three or more counter circuits which are different in frequency, to further improve time accuracy, as a matter of course.

As described in Embodiment 1 and Embodiment 2, the flow meter device of the present invention is configured to include the measurement control means for controlling, based on a time difference calculated by the time difference detecting means in an arbitrary measuring step among a series of measuring steps (in the above described example, "unit measuring steps") which are performed in succession, the number of times the measuring step following the arbitrary measuring step is performed. Therefore, it can be determined whether or not there is a fluid flow without a response delay, and a highly responsive measurement can be performed such that a measuring method is switched to correspond to presence/absence of a fluid flow.

Since the arbitrary measuring step is an initial measuring step among the series of measuring steps, responsiveness can be further improved.

If the time difference calculated by the time difference detecting means in the arbitrary measuring step among the series of measuring steps performed in succession is smaller than the threshold, the measurement control means cancels of the measuring step following the arbitrary measuring step. Therefore, it is possible to reduce electric power consumption in the case where there is no fluid flow.

If the time difference calculated by the time difference detecting means in the arbitrary measuring step among the series of measuring steps performed in succession is smaller than the threshold, the fluid flow calculating means is configured to calculate the fluid flow as zero during the arbitrary measuring step. Therefore, it is possible to reduce electric power consumption in the case where there is no fluid flow.

When the unit fluid flow calculating step is defined as the operation from the start of the series of measuring steps until the end of the fluid flow calculation, and if it is detected continuously that the fluid flow is zero, the measurement control means is configured to vary the interval at which the unit fluid flow calculating step is performed every time the unit fluid flow calculating step is performed. This makes it possible to prevent misdetermination that the fluid flow is zero, even in a case where a periodic pulsation occurs within the passage. As a result, measuring accuracy can be improved.

If the time difference calculated by the time difference detecting means in the arbitrary measuring step among the series of measuring steps performed in succession is greater than the threshold, the measurement control means is configured to perform the measuring step plural times in succession. Therefore, highly accurate measurement can be achieved in a case where there is a fluid flow.

The time measuring means is constituted by the reference clock and the counter circuit which performs counting based on the clock, and the time difference detecting means is constituted by the subtraction circuit using the counted value of the counter circuit such that multiplication and division in determination as to whether or not the fluid flow is zero is omitted. Thus, it can be determined whether or not there is a fluid flow, by a simple calculation method for merely operating the subtraction circuit. As a result, quick control can be realized.

The time measuring means is constituted by at least two reference clocks having different frequencies and at least two counter circuits which are different in frequency, the time difference detecting means calculates the time difference for each counter circuits, and the determiner means is configured to determine whether or not the fluid flow is zero based on a combination of all of counted value differences of the counters which are calculated by the time difference detecting means. Therefore, it can be determined whether or not the fluid flow is zero with higher accuracy.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A flow meter device of the present invention can provide a highly responsive flow meter device which is capable 2of quickly determining whether or not there is a fluid flow and of switching to a measuring method corresponding to presence/absence of a fluid flow. Therefore, the flow meter device of the present invention is applicable to a gaseous fluid flow meter or a liquid flow meter, as well as the gas meter.

The invention claimed is:

1. A flow meter device comprising:
a first transducer provided on a fluid passage to transmit/receive an ultrasonic signal, and a second transducer provided on the fluid passage to transmit/receive the ultrasonic signal;
a time measuring means for measuring a propagation time of the ultrasonic signal propagating between the first and second transducers;
a fluid flow calculating means which performs in succession a unit measuring step, and calculates a fluid flow based on propagation times corresponding to the number of times the unit measuring step is performed,
the unit measuring step comprising measuring the propagation time of the ultrasonic signal in a forward direction and the propagation time of the ultrasonic signal in a reverse direction by the time measuring means, such that a direction in which the ultrasonic signal is transmitted and received between the transducers is changed between the forward direction and the reverse direction;
a time difference detecting means which detects a difference between the propagation time in the forward direction and the propagation time in the reverse direction in the unit measuring step; and
a measurement control means which selects an arbitrary unit measuring step among a series of unit measuring steps performed in succession, and controls the number of times a unit measuring step following the arbitrary unit measuring step is performed, based on the time difference detected by the time difference detecting means.

2. The flow meter device according to claim 1, wherein the measurement control means selects an initial unit measuring step among the series of unit measuring steps, as the arbitrary unit measuring step.

3. The flow meter device according to claim 1, wherein when the time difference detected by the time difference detecting means in the arbitrary unit measuring step is smaller than a threshold, the measurement control means cancels the unit measuring step following the arbitrary unit measuring step.

4. The flow meter device according to claim 3, wherein when the time difference detected by the time difference detecting means in the arbitrary unit measuring step is smaller than the threshold, the fluid flow calculating means calculates a fluid flow during the arbitrary unit measuring step as zero.

5. The flow meter device according to claim 3, wherein when a unit fluid flow calculating step is defined as an operation performed from a start of the series of unit measuring steps until calculation of the fluid flow ends, and if it is continuously detected that the fluid flow is zero, the measurement control means varies an interval at which the unit fluid flow calculating step is performed every time the unit fluid flow calculating step is performed.

6. The flow meter device according to claim 1, wherein when the time difference detected by the time difference detecting means in the arbitrary unit measuring step, among the series of unit measuring steps performed in succession, is greater than a threshold, the measurement control means performs the unit measuring step a plural number times in succession.

7. The flow meter device according to claim 1, wherein the time measuring means comprises a reference clock and a counter circuit which performs counting based on the reference clock; and
the time difference detecting means comprises a subtraction circuit using a counted value of the counter circuit such that multiplication and division in determination as to whether or not the fluid flow is zero is omitted.

8. The flow meter device according to claim 7, wherein the time measuring means includes at least two reference clocks having different frequencies and at least two counter circuits which are different in frequency; the time difference detecting means calculates a counted value difference for each of the counter circuits; and the determiner means is configured to determine whether or not the fluid flow is zero based on a combination of all counted value differences of the counters which are detected by the time difference detecting means.

* * * * *